United States Patent

[11] 3,588,158

| [72] | Inventors | Duane B. Ford<br>2811 Hocking St., Sacramento, Calif.<br>Grant W. Walker, 4339 Lancey Court,<br>Placerville, Calif. 95667 |
|---|---|---|
| [21] | Appl. No. | 777,316 |
| [22] | Filed | Nov. 20, 1968 |
| [45] | Patented | June 28, 1971 |

[54] LIQUID FILLED SHOCK ABSORBING MODULAR BUFFER
3 Claims, 5 Drawing Figs.

[52] U.S. Cl. .................................................. 293/1,
267/116, 267/139, 293/60, 293/70, 293/71
[51] Int. Cl. ........................................................ B60r 19/08,
B61f 19/04, F16h 9/10
[50] Field of Search............................................ 293/1, 51
(F), 52 (F), 71, 71 (P), 60, 70; 267/116, 139

[56] References Cited
UNITED STATES PATENTS

| 1,486,222 | 3/1924 | Berry | 293/69 |
| 1,552,965 | 9/1925 | Smith | 293/71(P) |
| 1,791,415 | 2/1931 | Lacrotte | 293/71 |
| 2,959,146 | 11/1960 | Erkert | 293/71X |
| 3,284,122 | 11/1966 | Rich | 293/1 |

Primary Examiner—Arthur L. LaPoint
Assistant Examiner—Howard Beltran
Attorney—Kimmel, Crowell & Weaver ABSTRACT: The combination of a nearly rigid strongly resilient backing board formed of a laminated wood core and resin bonded fiber glass surfaces with a shock-absorbing buffer member of the type which comprises a resilient hollow body member normally filled with water having one or more openings, which are normally closed, for permitting escape of at least part of the water in a quantity and at a limited rate only commensurate with the severity of collision impact is disclosed.

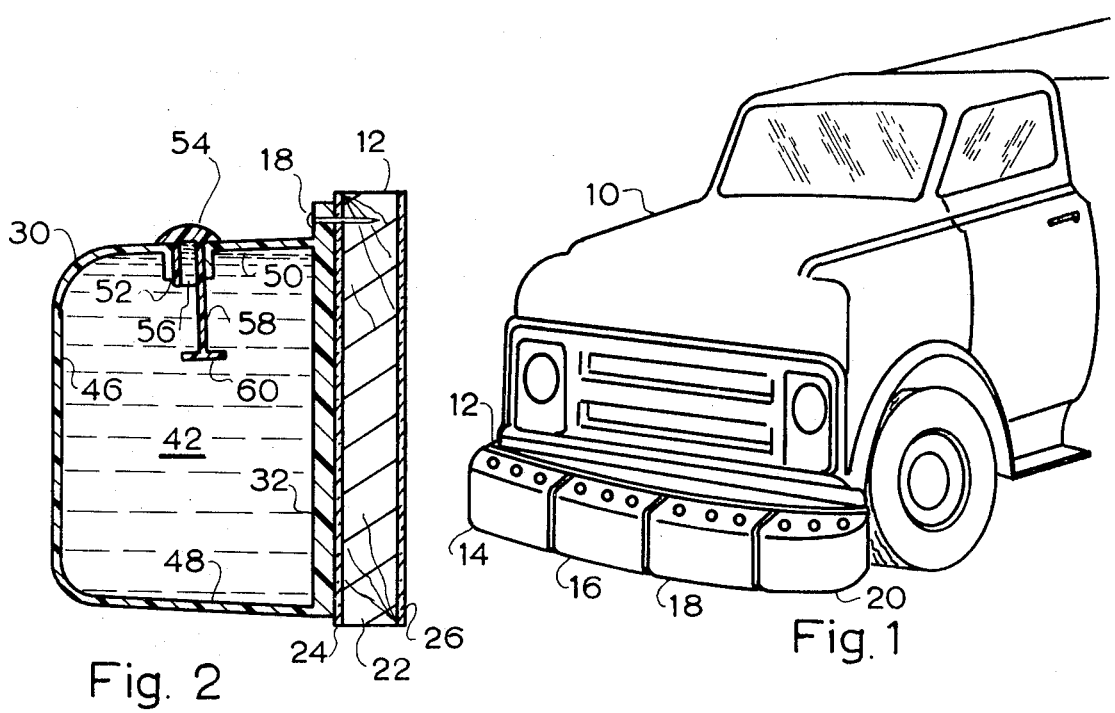
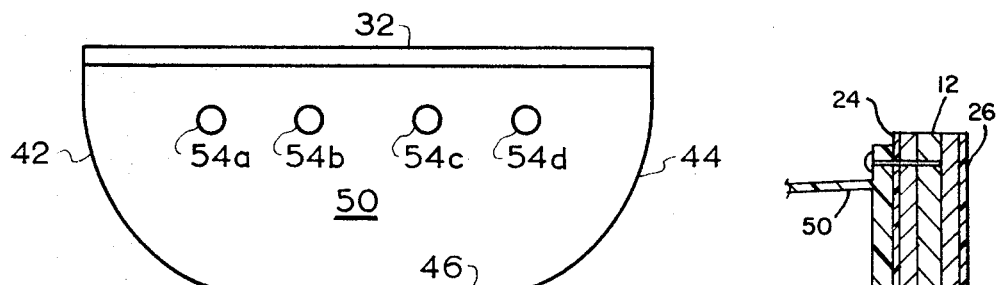
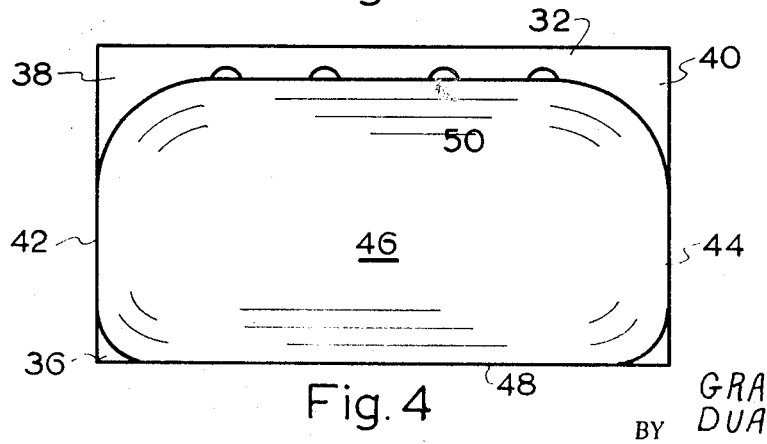
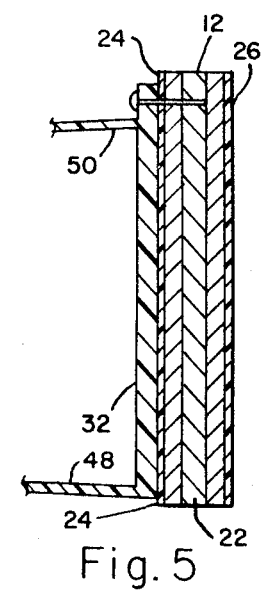
INVENTORS
GRANT W. WALKER
BY DUANE B. FORD
Kimmel, Crowell & Weaver

3,588,158

LIQUID FILLED SHOCK ABSORBING MODULAR BUFFER

BACKGROUND OF THE INVENTION

1. Field of the Invention

This invention relates to vehicles and, more particularly, to vehicle bumper constructions of the type which are designed or absorb and dissipate collision impact energies.

2. Description of the Prior Art

Many efforts have been made to eliminate or reduce the disastrous effect of the collision of a vehicle with another vehicle or a fixed object. To our knowledge, however, the only technically and commercially successful bumper of this type is the RICH SOFT CUSHION WATER BUMPER described by the inventor, John W. Rich, in U.S. Pat. No. 3,284,122, issued Nov. 8, 1966. The present invention constitutes a shock-absorbing buffer generally of the type described in the aforementioned Rich patent, the disclosure of which is incorporated herein, in a novel combination with a specially designated backing board to provide greater strength and effectiveness. It is, therefore, the primary object of this invention to provide an improved combination modular buffer bumper.

SUMMARY OF THE INVENTION

The present invention comprises the combination of a nearly rigid strongly resilient backing board for being secured to a vehicle, the backing board being comprised of a laminated wood center having a resin bonded fiber glass surface on each face thereof and a plurality of shock-absorbing buffer members secured to the front surface of the backing board, each of the buffer bumpers comprising a hollow body member made of resilient material of sufficient rigidity normally to retain a predetermined shape and of sufficient strength to resist rupture upon impact and including means for permitting securement of the body member to the backing board. The body member is normally filled with liquid and has a plurality of openings therein, which are normally closed with resilient stoppers, whereby impact against the body displaces the closing means permitting escape of at least a portion of the liquid in a quantity and at a limited rate only commensurate with the severity of impact and consequent deformation of the body member. The principal object of the invention, therefore, is to provide an improved combination backing board and buffer member bumper.

A more specific object of the invention is to provide the combination of a plurality of buffer modules with a single substantially rigid backing board of special construction.

The specific combinational and constructional features disclosed herein constitute further and nonlimiting objects of the invention.

Other objects of the invention will be apparent from the specification which follows and from the drawing to which reference is now made.

BRIEF DESCRIPTION OF THE DRAWING

FIG. 1 is a perspective view of a vehicle showing the bumper combination of this invention in place on the front thereof.

FIG. 2 is a side elevational view in cross section showing the combination of this invention.

FIG. 3 is a top plan view showing the configuration of one module of the buffer members of this invention.

FIG. 4 is a front elevational view showing the configuration of the buffer members of this invention.

FIG. 5 is a side elevational view in cross section similar to FIG. 2, but showing the use of a laminated backing board.

DESCRIPTION OF THE PREFERRED EMBODIMENTS

As illustrated in FIG. 1, a vehicle 10, which is illustrated as being a truck, but which may be an automobile or any type of vehicle, is provided with a backing board 12 to which are secured a plurality of buffer members 14, 16, 18, and 20.

It will be understood that this combination bumper arrangement may be used either on the front or the back, or both, of any conventional and most nonconventional vehicles. This combination may also be used on fixed installations which are subject to impact by vehicles. For example, this combination is useful in preventing damage to loading docks and walls and supports in garages where vehicles are driven for service or storage.

FIG. 2 illustrates in greater detail the construction of this invention. Reference is also made to FIGS. 3 and 4 for illustration of various facets of the overall invention.

As best shown in FIG. 2, however, the backing board 12 comprises a wood center 22 and a fiber glass face 24 on the front and a fiber glass face 26 on the back. These fiber glass faces are bonded with a resin in a known manner. For example, it is known to bond fiber glass fabric and mat using polyester resins. The fiber glass material and the polyester resins are commercially available and common articles of commerce. The core 22 is illustrated as being of wood and, preferably, is of a laminated (plywood) construction.

The importance of this construction, as compared with metal, will be discussed in some detail hereinafter.

Secured by means of a frictional fastener such as a screw 28, bolt, or the like, to the front face of the backing board 12 are a plurality of buffer members of the type shown generally at 30. These buffer members comprise a backwall which is generally flat, shown at 32, which preferably includes lower corners 34 and 36 and upper corners 38 and 40 which extend beyond the periphery of the remainder of the body member to permit securement of the buffer member to the backing board. In practice, brackets are conventionally provided for receiving the lower corners 34 and 36 and frictional fasteners such as bolts are used to secure the upper corners 38 and 40 to the backing board.

The hollow body member also comprises end walls 42 and 44, front wall 46, and bottom wall 48, all of which are shown in FIGS. 2, 3, and 4.

The body member also includes a top wall 50 which has formed therein a plurality of openings 52. In the preferred embodiments, these openings are formed unitarily with the body member and include lips extending downwardly and tapering inwardly into the hollow center portion of the body member. A stopper 54 closes each of the openings. The stopper preferably includes an inwardly tapering, hollow, resilient, generally cylindrical portion extending into and being adapted to be received by the lips of the opening. A string or extension 58 with a cross member 60 is also provided, in the preferred model, to prevent loss of the stopper upon impact, since the stopper is forcibly expelled from the body member by the deformation of the walls and the pressure of the fluid.

As illustrated in FIG. 3, a plurality of openings and closing means 54a, 54b, 54c, and 54d. For smaller modular buffer members, however, only one opening and closing means may be required.

The operation of the buffer members is adequately disclosed and described in the aforementioned patent of John W. Rich. Briefly, however, upon collision impact the walls of the body member deform and pressure is exerted upon the liquid, generally water, in the bumper. This combination forcibly expels the stoppers 54 from the openings and forces the water out of the openings. The water is permitted to escape at a limited rate, however, only commensurate with the degree and severity of the impact. Thus, a minor impact will cause the water to escape at a lower rate than will a severe impact. It is this feature in combination with the resilient body which permits the effective operation of the bumper. It is known, for example, to provide crushable or frangible containers having compressible or noncompressible fluids therein for absorbing shock. However, such containers are of very limited effect since, once the container ruptures, the rate of discharge of liquid or fluid therefrom is virtually independent of the severity of the impact.

The openings in the preferred embodiment of the bumpers generally range from inch to 1½ inches, preferably on the order of about 1 to 1¼ inches. The size of these openings, in combination with the resiliency of the body member, etc., is best described as being of such a size, disposition and configuration that as a result of viscous liquid flow the rate of escape of liquid is proportional to or commensurate with the severity of impact upon the hollow body portion of the bumper. A number of such openings has been found most desirable since too large an opening is required if only one is used and the rate of expulsion of liquid approaches the unlimited.

The foregoing operation is now fairly well understood and is described by Rich in the aforementioned patent. The significance and importance of the nature of the backing plate, however, has not been appreciated. Originally, it was though that the buffer members would be as effective secured to a steel backing plate or to a regular automobile bumper as they would be secured to any other type of backing. Experiments have shown, however, that securement to conventional bumpers and steel plates is not entirely satisfactory. First, it has been noted that the effectiveness of energy dissipation by the buffer members is considerably less when a steel backing plate is used as compared with the backing board of this invention. Moreover, it has been found that there is often bending, warping, twisting, or other deformation of the steel backing plate, making total replacement of the backing plate necessary. Quite unexpectedly, while the toughness of the backing board on this invention is considerably less than the overall strength and toughness of a conventional steel backing plate, it has been found that the backing boards of this invention do not suffer deformation or breakage upon rather severe impact.

The importance of this was first noted using very heavy vehicles, e.g., buses, when it was noted that minor, and sometimes significant, damage occurred to the steel backing units on these buses. As an interim measure, plywood backing boards were provided. As indicated, quite unexpectedly, the backing boards provided substantially greater effectiveness in absorbing the collision impact energy and, in spite of contrary prior expectations, did not break except upon the most severe impact. Breakage, however, did tend to splinter the boards and make repairs difficult and sometimes increased damage to the buffer units.

Accordingly, a layer of resin bonded fiber glass was provided on each surface of the plywood boards. This not only provided greater strength and toughness and weather resistance, but gave additional effectiveness and durability to the buffer members.

It has been our experience that not only is the life and utility of the buffer member combination improved by using the backing boards of this invention, but the effectiveness in absorbing collision impacts is significantly and unexpectedly improved.

While the foregoing invention has been described with reference to specific examples and embodiments, it will be understood that variations may be made from these examples based upon the teachings of the foregoing specification without departing from the spirit and scope of the invention as defined in the following claims.

We claim:

1. A buffer bumper combination which comprises:
    a nearly rigid strongly resilient backing board for being secured to a vehicle, said backing board having front and rear surfaces and comprising a wood section and a resin bonded fiber glass surface layer on the front surface thereof; and
    a plurality of shock-absorbing buffer members secured on the front surface of said backing board, each of said buffer members comprising a hollow body member comprised of a resilient material of sufficient rigidity normally to retain a predetermined shape, and of sufficient strength to resist rupture upon impact thereagainst, means securing of said body member to said backing board, liquid normally filling said member, said body member having at least one opening therein and means normally closing said opening, whereby impact against said body member displaces said closing means permitting escape of at least a portion of said liquid in a quantity and at a limited rate only commensurate with the severity of impact and consequent deformation of said body member.

2. The buffer bumper of claim 1 wherein:
    said wood section is of laminated construction and the rear surface of said wood section also has a resin bonded fiber glass surface layer thereon.

3. The buffer bumper of claim 2 wherein securement permitting means of the shock-absorbing buffer members comprises:
    a relatively flat backwall portion which includes portions extending beyond the periphery of the rest of the body member portions for permitting securement thereof to the backing board.